United States Patent Office 3,334,110
Patented Aug. 1, 1967

3,334,110
METHOD FOR PREPARING
EPOXYOXAZOLIDINONES
Charles H. Schramm, Easton, Pa., assignor to J. T. Baker Chemical Company, Phillipsburg, N.J., a corporation of New Jersey
No Drawing. Filed Aug. 16, 1965, Ser. No. 480,155
16 Claims. (Cl. 260—307)

This invention relates to a method for preparing epoxyoxazolidinones. In a particular aspect this invention relates to a method for preparing polymerizable 2-oxazolidinone compounds having at least one epoxy-containing substituent. The epoxyoxazolidinones prepared by the method of this invention are also described in Belgian Patent 647,000 which was granted on Oct. 23, 1964. However, the method for preparing epoxyoxazolidinones by the instant invention differs substantially from that described in the Belgian patent. Furthermore, the method of this invention affords products without the need to remove solvent or dehydro halogenation products from the reaction mixture. The epoxyoxazolidinones are polymerizable to form a wide variety of products by the same techniques or co-reactants and in the same manner as is set forth in the said Belgian patent.

Briefly, in a preferred embodiment of this invention, a polyisocyanate is reacted with a polyepoxide, wherein the reaction mixture contains a greater number of epoxy groups as compared to isocyanate groups, in the presence of a catalytically effective quantity of alcohol and quaternary ammonium salt to produce a viscous epoxy-2-oxazolidinone compound containing at least two 2-oxazolidinone groups and at least two epoxy groups.

For the sake of convenience and clarity, some of the terms used herein are defined as follows:

(a) The term "polyisocyanate" refers to compounds containing two or more isocyanate (—NCO) groups;

(b) The term "epoxide" or "epoxy" refers to the oxirane group

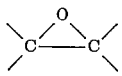

(c) The term "2-oxazolidinone" refers to the structure

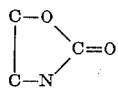

(d) The term "epoxyoxazolidinone" or "epoxy-substituted 2-oxazolidinone" refers to organic compounds containing one or more 2-oxazolidinone groups and one or more epoxy groups.

The epoxyoxazolidinone compounds of the present invention can be prepared by simply admixing the epoxy and isocyanate reactants in the presence of a catalyst mixture comprising an addition polymerization catalyst and an alcohol. The quantity of catalyst, i.e., the quaternary and alcohol cocatalysts, employed can vary over a wide range such as that of about 0.005% to about 15% by weight of the epoxy and isocyanate reactants and preferably from about 0.01% to about 10% by weight of the reactants. The reaction temperature can vary over a wide range such as that from about 20° C. to about 150° C. and preferably the reaction mixture is heated above room temperature (i.e., above about 25° C.) to a temperature such as that of from about 60° C. to about 110° C. The ratio of isocyanate reactant to epoxy reactant can vary over a broad range but designed to provide at least one unreacted epoxy group in the epoxyoxazolidinone compounds. Preferably, from about 1.5 to about 15 epoxy groups are provided in the reaction mixture per isocyanate group and particularly from about 2 to about 8 epoxy groups per isocyanate group.

The preferred catalyst for the reaction of polyisocyanates and polyepoxides to produce an epoxyoxazolidinone are a mixture of a quaternary ammonium compound with a primary or secondary aliphatic alcohol, e.g., alkanol having from 1 to 6 carbon atoms. The rate of reaction increases with increasing concentrations of alcohol and quaternary. The active isocyanate content of the epoxyoxazolidinone, however, decreases with increasing alcohol concentration. Preferably, the catalyst mixture contains from about 1 to about 20 parts by weight of the aliphatic alcohol per part by weight of the quaternary and particularly from about 3 to about 9 parts by weight of the aliphatic alcohol per part by weight of the quaternary. Preferably, the aliphatic alcohol has from 1 to about 8 carbon atoms. Illustrative of the aliphatic alcohol component of the catalyst mixture, there can be mentioned various monohydroxy alcohols such as methanol, ethanol, n-propyl alcohol, normal butyl alcohol, n-hexyl alcohol, secondary butyl alcohol, amyl alcohol, isoamyl alcohol, isopropyl alcohol, and the like.

The quaternary cocatalyst can be represented by the formula:

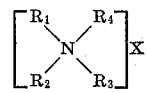

in which X is a halogen, i.e., fluoride, chloride, bromide and iodide; and each of $R_1$, $R_2$, $R_3$ and $R_4$ can be an alkyl, cycloalkyl, aryl, alkaryl or aralkyl radical. The hydrocarbon radicals represented by $R_1$, $R_2$, $R_3$ and $R_4$ may have from 1–16 carbon atoms. Also, the nitrogen can be part of a heterocyclic ring, e.g., piperidine.

Illustrative of specific quaternary cocatalysts which can be employed, there can be mentioned tetraethylammonium bromide, tetramethylammonium bromide, benzyltriethylammonium bromide, tetrabutylammonium bromide, benzyltriethylammonium bromide, benzyltrimethylammonium bromide, and the corresponding chlorides, iodides and fluorides. The halide in the anionic portion of the quaternary can be chlorine, bromine, iodine or fluorine but preferably bromine. Preferred alkyl groups of the quaternary are lower alkyl groups, each having from 1 to about 6 carbon atoms. It has been found that the use of an insoluble quaternary such as tetraethylammonium chloride together with a primary or secondary aliphatic alcohol results in a very sluggish reaction.

Tertiary amines and other addition polymerization catalysts together with a primary or secondary aliphatic alcohol as mentioned hereinbefore can also catalyze the formation of the isocyanateoxazolidinone compounds. Generally, however, they have the disadvantage of causing further reactions of the isocyanate group and result in poor storage stability of the compounds. Illustrative of suitable tertiary amine cocatalyst, there can be mentioned triethylamine, triethylene diamine or N-methyl morpholine, and the like.

In addition to the reaction of a polyisocyanate and polyepoxide providing a larger number of epoxy groups than isocyanate groups of the polyisocyanate in the presence of a catalyst mixture of an alcohol and an addition polymerization catalyst to prepare the epoxyoxazolidinones, this invention also includes the reaction of a polyurethane having terminal alkyl urethano groups with a polyepoxide providing a greater than equivalent quantity of epoxy groups in the presence of an addition polymerization catalyst. This reaction is conducted in a similar manner as that of a polyepoxide with a polyisocyanate except that a polyurethane is employed instead of a polyisocyanate and the catalyst mixture need not contain the alcohol. Preferably, the polyurethane employed in this reaction is of the formula:

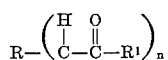

where R is the organic residue of a polyisocyanate; $R^1$ is an alkyl group having from 1 to about 8 carbon atoms; and $n$ is an integer from 2 to 10, and particularly 2.

Although the reaction as described above can be conducted by the use of a polyurethane instead of a polyisocyanate, the latter process is preferred. The primary reason for the preference is that the process is more efficient and economical by the use of a polyisocyanate. In the use of a polyisocyanate a small quantity of alcohol is employed which acts catalytically. This eliminates the large volumes of materials and by-products in the reaction of a polyurethane and particularly eliminates recovery equipment for alcohol by-products.

The epoxyoxazolidinone compounds of the present invention are generally highly viscous liquids. However, hard solids can also be produced. They are characterized by molecular weights which can vary over a wide range, and particularly from about 325 to 1,200; however, the molecular weights can range up to 5,000 or higher. The epoxyoxazolidinones can be cured with epoxy curing catalysts or reacted with epoxy hardeners to yield a broad variety of polymers as more fully set forth in Belgian Patent 647,000 which have various utilities as set forth in said Belgian patent, e.g., the fields of coating, laminating, bonding, molding, potting, calendering, plasticizers for acrylic resins, foams, elastomeric products and the like.

Illustrative of the process for preparing epoxyoxazolidinone compounds is the interaction of toluene di-isocyanate with butadiene diepoxide in the presence of a catalyst mixture of methanol and tetraethyl ammonium bromide as illustrated below:

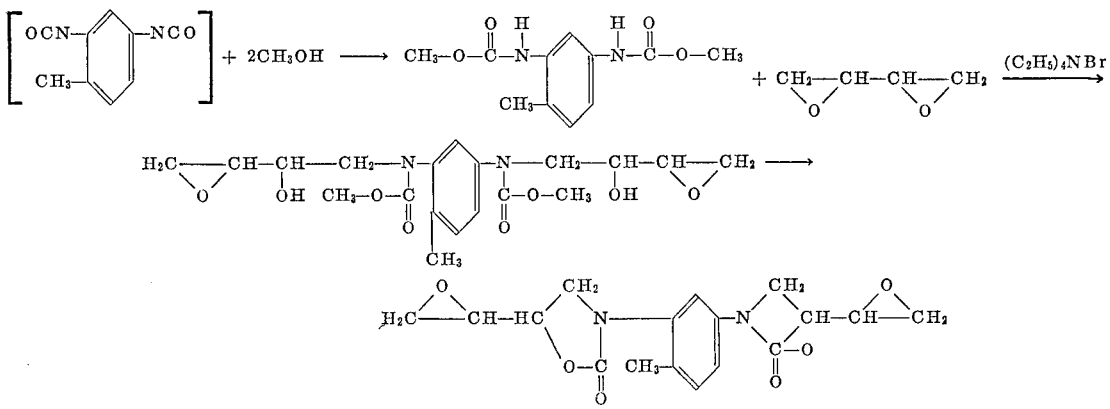

The reaction for the formation of epoxyoxazolidinones can be conducted in the presence of a solvent which is substantially inert to the reactants under reaction conditions. The solvent can be removed from the reaction product by simple distillation on completion of the reaction. Typical solvents include dioxane, dimethylformamide, etc.

Epoxyoxazolidinone compounds of this invention include those which correspond to the structure:

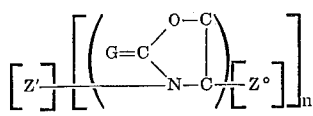

where $Z''$ is a polyvalent organic radical, $Z°$ is a polyvalent organic radical which contains at least one epoxy group, and $n$ is a whole number of from 2 to 10 and higher.

Among the preferred epoxyoxazolidinone compounds are those which correspond to the structure:

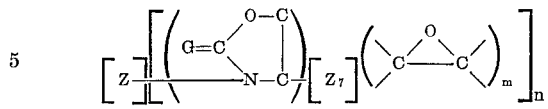

wherein Z is a polyvalent organic radical selected from aliphatic and aromatic structures such as alkylene, substituted alkylene, alkyleneoxy, alkenylene, substituted alkenylene, arylene, substituted arylene, and the like; $Z'$ is a polyvalent organic radical selected from aliphatic and aromatic structures such as alkylene, substituted alkylene, alkyleneoxy, cycloalkylene, substituted cycloalkylene, arylene, substituted arylene, aryleneoxy, substituted aralkylene, and the like, and $Z'$ can also be zero, i.e., $Z'$ can be a covalent bond directly connecting an oxazolidinone group with an epoxy group; G is sulfur or oxygen, $m$ is a whole number of from 1 to 5 and higher, and $n$ is a whole number such as that of from 2 to 10 and higher.

In the reaction of two moles of a diepoxide with one mole of a diisocyanate, the reaction product contains an epoxyoxazolidinone having at least two oxazolidinone groups and two epoxy groups which can be represented by the formula

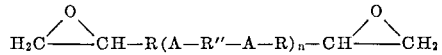

wherein each of R represents the organic residue of a diepoxide or simply a covalent bond, $R''$ represents the organic residue of a diisocyanate, and each A represents a 2-oxazolidinone group, e.g.,

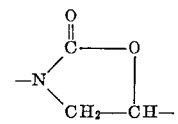

and $n$ is an integer representing the number of repeating units of the reaction product, e.g., 1 to 10.

In addition to carbon, hydrogen, oxygen, sulfur, nitrogen, and halogen atoms, the compounds of the present invention can also contain silicon, titanium, phosphorus, and the like.

Polyisocyanate reactants suitable for use in the production of the epoxyoxazolidinone compounds include isocyanate compounds and isocyanate containing prepolymers which are being developed for commercially important polyurethane chemistry.

Among the polyisocyanate reactants are those corresponding to the formula $R(NCG)_x$ wherein G is oxygen or sulfur, $x$ is an integer of two or more, and R is the organic residue of a polyisocyanate such as alkylene, substituted alkylene, arylene or substituted arylene radical, a hydrocarbon or substituted hydrocarbon containing one or more aryl —NCG bonds and one or more alkyl —NCG bonds. R can also include radicals such as —RZR— where Z can be a divalent moiety such as —O—, —O—R—O—, —CO—, —CO₂—, —S—, —S—R—S—, —SO₂—, and the like. Examples of such compounds include hexamethylene diisocyanate, xylylene diisocyanates, (OCNCH₂CH₂CH₂OCH₂)₂, 1-methyl - 2,4 - diisocyanatocyclohexane, phenylene diisocyanates, tolylene diisocyanates, chlorophenylene diisocyanates, polyhalophenylene diisocyanates, diphenylmethane - 4,4' - diisocyanate, naphthalene - 1,5 - diisocyanate, triphenylmethane - 4,4', 4''-triisocyanate, xylene-α, α'-diisothiocyanate, isopropylbenzene-α, 4-diisocyanate, and the like.

Further included among the polyisocyanate reactants are dimers and trimers of isocyanates and diisocyanates and polymeric diisocyanates of the general formula (RNCG)ₓ and [R(NCG)ₓ]y in which x and y are two or more, as well as compounds of the general formula M(NCG)ₓ in which x is two or more and M is a monofunctional or polyfunctional atom or group. Examples of this type include ethylphosphonic diisocyanate, $$C_2H_5P(O)(NCO)_2$$

phenylphosphonic diisocyanate, $C_6H_5P(NCO)_2$; compounds containing a $\equiv Si-NCG$ group, isocyanates derived from sulfonamides, $R(SO_2NCO)_x$; and the like.

A particularly useful mixture of polyisocyanates are the products obtainable by phosgenation of the reaction products of aniline and formaldehyde as expressed by the following general formula:

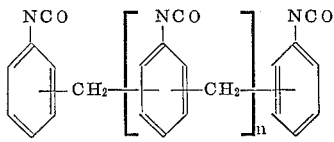

wherein n equals 0 to 10.

Epoxide reactants suitable for use in the preparation of the isocyanateoxazolidinone compounds of this invention are essentially unlimited, and the particular epoxide selected will depend on cost, availability, reactivity, the properties of the product sought to be produced, and other practical considerations. The epoxides can be those containing aromatic, aliphatic, or cycloaliphatic groups together with the epoxy group. Useful polyepoxides include glycidyl ethers derived from epichlorohydrin adducts of polyols and polyhydric phenols. Other polyepoxides include:

3-methyl-1,5-pentanediol-bis(3,4-epoxycyclohexanecarboxylate),
1,5-pentanediol bis(3,4-epoxycyclohexanecarboxylate),
2-methoxymethyl-2,4-dimethyl-1,5-pentanediol bis(3,4-epoxycyclohexanecarboxylate,
ethylene glycol bis(3,4-epoxycyclohexanecarboxylate),
2,2-diethyl-1,3-propanediol bis(3,4-epoxycyclohexanecarboxylate),
1,6-hexanediol bis(3,4-epoxycyclohexanecarboxylate),
2-butene-1,4-diol bis(3,4-epoxy-6-methylcyclohexanecarboxylate),
1,1,1-trimethylolpropane tris(3,4-epoxycyclohexanecarboxylate),
1,2,3-propanetriol tris(3,4-epoxycyclohexanecarboxylate);

oxyalkylene glycol epoxycyclohexane carboxylates exemplified by compounds which include dipropylene glycol bis(2-ethylhexyl-4,5-epoxycyclohexane-1,2-dicarboxylate),
diethylene glycol bis(3,4-epoxy-6-methylcyclohexanecarboxylate),
triethylene glycol bis(3,4-epoxycyclohexanecarboxylate);

epoxycyclohexylalkyl epoxycyclohexanecarboxylates exemplified by compounds which include 3,4-epoxycyclohexylmethyl 3,4-epoxycyclohexanecarboxylate,
3,4-epoxy-1-methylcyclohexylmethyl 3,4-epoxy-1-methylcyclohexanecarboxylate,
3,4-epoxy-2-methylcyclohexylmethyl 3,4-epoxy-2-methylcyclohexanecarboxylate,
(1-chloro-3,4-epoxy-cyclohexan-1-yl)methyl 1-chloro-3,4-epoxycyclohexanecarboxylate,
(1-bromo-3,4-epoxycyclohexanol-yl)methyl 1-bromo-3,4-epoxycyclohexanecarboxylate,
(1-chloro-2-methyl-4,5-epoxycyclohexan-1-yl)methyl 1-chloro-2-methyl-4,5-epoxycyclohexanecarboxylate;

epoxycyclohexylalkyl dicarboxylates exemplified by compounds which include bis(3,4-epoxycyclohexylmethyl) pimelate,
bis(3,4-epoxy-6-methylcyclohexylmethyl) maleate,
bis(3,4-epoxy-6-methylcyclohexylmethyl) succinate,
bis(3,4-epoxycyclohexylmethyl) oxalate,
bis(3,4-epoxy-6-methylcyclohexylmethyl) sebacate,
bis(3,4-epoxy-6-methylcyclohexylmethyl) adipate;

epoxycyclohexylalkyl phenylenedicarboxylates exemplified by compounds which include bis(3,4-epoxycyclohexylmethyl) terephthalate,
bis(3,4-epoxy-6-methylcyclohexylmethyl) terephthalate;

epoxycyclohexylalkyl oxyalkylene glycol ethers exemplified by compounds which include bis(3,4-epoxy-6-methylcyclohexylmethyl) diethylene glycol ether; sulfonyldialkanol bis(epoxycyclohexanecarboxylates) exemplified by compounds which include 2,2'-sulfonyldiethanol bis(3,4 - epoxycyclohexanecarboxylate); epoxycyclohexane-1,2-dicarboximides exemplified by compounds which include N,N'-ethylene bis(4,5-epoxycyclohexane-1,2-dicarboximide); epoxycyclohexylalkyl carbamates exemplified by compounds which include di(3,4-epoxycyclohexylmethyl) 1,3-tolylenedicarbamate; epoxycyclohexylalkyl acetals exemplified by compounds which include bis(3,4 - epoxy - 6 - methylcyclohexylmethyl), 3,4-epoxy-6-methylcyclohexanecarboxaldehyde acetal; and epoxycyclohexyl-substituted spirobi(metadioxane) derivatives exemplified by compounds which include 3,9-bis(3,4-epoxycyclohexyl)spirobi - (metadioxane). Other poly-(epoxy) compounds can be employed such as 3,4-epoxy-6 - methylcyclohexylmethyl 9,10 - epoxystearate, 1,2 - bis (2,3-epoxy-2-methylpropoxy)-ethane, the diglycidyl ether of 2,2-(p-hydroxyphenyl) propane, butadiene dioxide, dicyclopentadiene dioxide, pentaerythritol tetrakis(3,4-epoxycyclohexanecarboxylate), vinylcyclohexene dioxide, divinylbenzene dioxide, and the like. A preferred class of polyepoxide reactants are polyglycidyl ether terminated organic polyhydric alcohols having molecular weights of from about 100 to 4,000 and particularly from about 150 to 1,000. The polyhydric alcohols, e.g., having 2 or 3 hydroxy groups, are preferably: poly(oxyalkylene) glycols; alkylene oxide adducts of aliphatic polyols; and polyhydroxy phenolic compounds. The alkylene groups of the poly(oxyalkylene) glycols and alkylene oxides can have from 2 to 4 carbon atoms and particularly 2–3 carbon atoms. The poly (glycidyl ether) terminated polyhydric alcohols (polyols) can be represented by the formula:

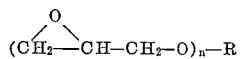

wherein n is an integer such as 2 or 3 and R represents the polyol residue after removal of terminal hydroxy groups. A suitable polyglycidyl ether polyol of the above formula is the diglycidyl ether of bisphenol A, the formula of which is set forth as follows:

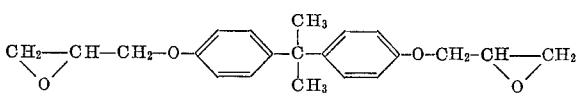

Illustrative of other polyglycidyl ethers of polyols of the above formula there can be mentioned those prepared by the reaction of: about 2 moles of epichlorohydrin with one mole of a polyethylene glycol or polypropylene glycol having a molecular weight of 200, 400, or 800; about two moles of epichlorohydrin with one mole of tetraethylene glycol, tetrapropylene glycol and the like; and about three moles of epichlorohydrin with one mole of the propylene oxide adduct of trimethylol propane having a molecular weight of about 400; about 4 moles of epichlorohydrin with one mole of 1,1,8,8-tetrakis(hydroxy-2,5-dimethylphenyl) octane. The reaction of epichlorohydrin with a polyol to produce a poly(glycidyl ether) terminated compound is well-known, e.g., by carrying out the reaction in the presence of sodium hydroxide.

The following examples are illustrative of the invention:

EXAMPLE 1

To 300 g. (1 mole) of polyethylene glycol 200 (i.e., molecular weight of about 200) was added dropwise 185 g. (2 moles) of epichlorohydrin at 80° C. in the presence of 0.25 ml. boron trifluoride. The dichlorohydrin thus produced was dissolved in 400 ml. ethylene dichloride. Sodium hydroxide flakes 88 g. (2.2 moles) was added portionwise at 60–70° C. for 2–2½ hrs. The mixture was cooled to room temperature, neutralized with carbon dioxide gas. The mixture was filtered; the filtrate of diepoxide was concentrated in vacuo; Brookfield viscosity <400 cp. 25° C. This diepoxide (164.8 g., 0.4 mole) was mixed with 34.8 g. (0.2 mole) of tolylene diisocyanate (80%, 2, 4 isomer) and 1 ml. of a 10% solution of tetraethylammonium bromide in methanol. The reaction was heated at 94° C. for 2½ hrs. After 1 hour the free isocyanate had disappeared. The epoxyoxazolidinone product had the following analysis: Chlorine=3.14%; Oxirane= 3.9%; and Brookfield viscosity 4960 cp. (25° C.).

EXAMPLE 2

*Panel prepared from the epoxyoxazolidinone of Example 1*

| Panel Prepared from— | Tensile, lbs. | Elongation, percent | Hardness Shore D |
|---|---|---|---|
| 2 parts of the epoxyoxazolidinone of Example 3; 1 part Epon 828* Stoichiometric amount of aminoethylpiperazine after 7 days at 105° C. | 3,850 | 72 | 62 |

*Polyepoxy polymer having a molecular weight of about 350 to 400 sold by Shell Chemical Company prepared by condensing epichlorohydrin with bisphenol A.

EXAMPLE 3

To 800 g. (1 M) of polypropylene glycol (mol wt. 800) was added dropwise 189.6 g. (2.05 M) of epichlorohydrin at 80° C. in the presence of 0.3 ml. boron trifluoride etherate. The resulting dichlorohydrin (989.6 g., 1.0 M) was dissolved in 1000 ml. ethylene dichloride. Sodium hydroxide flakes (88 g., 2.2 M) was added in portions. Temperature was controlled at 65–70° C. for 2½ hrs. The mixture was cooled to room temperature, neutralized with carbon dioxide gas. The mixture was filtered, the filtrate was concentrated in vacuo. The diepoxide was a mobile liquid; oxirane=3.2%.

The above diepoxide (905 g., 1.0 M) was mixed with tolylene diisocyanate (80% 2,4; 20% 2,6) 87 g., 0.5 mole and 2.5 ml. of a 10% solution of tetraethylammonium bromide in methanol. The reaction was heated at 94–96° C. for 6 hrs. The resulting product was free of isocyanate groups, had an oxirane content of 2.6%.

EXAMPLE 4

To 420 g. (1 mole) of a propylene oxide adduct of trimethylolpropane was added 305.2 g. (3.3 moles) of epichlorohydrin at 80° C. in the presence of 1 ml. boron trifluoride etherate. The resulting trichlorohydrin was dehydrohalogenated in the usual manner to produce the triepoxide having the following characteristics; oxirane= 6.81%; chlorine=4.19%; and a Brookfield viscosity of 120 cp. (25° C.). This triepoxide (184.8 g., 0.15 M) was mixed with 13.0 g. (0.075 M) tolylene diisocyanate (80% 2,4-isomer) and 0.75 ml. of a 10% solution of tetraethylammonium bromide in methanol. The mixture was heated to 94° C. for 2 hrs. After one hr. free isocyanate had disappeared. The epoxyoxazolidinone product contained 4.09% chlorine; 5.6% oxirane; Brookfield viscosity=600 cp. (25° C.).

EXAMPLE 5

*Panel prepared from the epoxyoxazolidinone of Example 4*

| Panel Prepared from— | Tensile, lbs. | Elongation, percent | Hardness Shore D |
|---|---|---|---|
| 2 parts of the epoxyoxazolidinone of Example 5; 1 part Epon 828 Stoichiometric amount of aminoethylpiperazine after 7 days at 105° C. | 770 | 46 | 28 |

EXAMPLE 6

One mole of the diurethane obtained by reacting one mole of toluene diisocyanate (80% 2,4-isomer) with two moles of ethanol is mixed with two moles of butadiene diepoxide and 8 ml. of a 10% solution of tetra (n-butyl) ammonium bromide in ethanol. The reaction mixture is heated for 6 hours at 75° C. The temperature is then raised to distill off ethyl alcohol. The residue is an epoxyoxazolidinone.

EXAMPLE 7

One mole of hexamethylene diisocyanate is mixed with two moles of the diglycidyl ether of bisphenol A and 5 ml. of a 10% solution of tetramethylammonium bromide in methanol. The mixture is heated at 105° C. until free isocyanate disappears. The resulting oxazolidinone is free of isocyanate groups.

What is claimed is:

1. A process for preparing a substituted 2-oxazolidinone having at least one epoxy-containing substituent which comprises:
   (a) reacting a polyisocyanate with a polyepoxide, said polyepoxide characterized by having an oxygen atom attached to 2 adjacent carbon atoms for each epoxy group, wherein the total number of epoxy groups is greater than the total number of isocyanate groups reacted therewith; in
   (b) the presence of a catalyst mixture comprising from .005% to about 15%, by weight of said polyisocyanate and polyepoxide, of (1) an addition polymerization catalyst selected from the group consisting of tertiary amines and quaternary ammonium halides and (2) a primary or secondary alkanol having from 1 to 6 carbon atoms.

2. A process for preparing a substituted 2-oxazolidinone having at least one epoxy group which comprises:
   (a) contacting a polyisocyanate with a polyepoxide, said polyepoxide characterized by having an oxygen atom attached to 2 adjacent carbon atoms for each epoxy group, wherein the total number of epoxy groups in the quantity of polyepoxide reactant is greater than the total number of isocyanate groups in the quantity of polyisocyanate contacted therewith; in the presence of
   (b) from .005% to about 15%, by weight of said polyisocyanate and polyepoxide, of a catalyst mixture comprising a quaternary ammonium halide and a primary or secondary alkanol having from 1 to 6 carbon atoms, said catalyst mixture containing from 1 to 20 parts by weight of the alkanol per part of the quaternary.

3. A process of claim 2 wherein the reactants are contacted at a temperature of from about 60° C. to about 150° C.

4. A process of claim 3 wherein the reaction mixture contains from about 1.5 to about 15 epoxy groups per isocyanate group ammonium halide is from about .005% to 15%, by weight of the polyisocyanate and polyepoxide reactants.

5. A process for preparing a substituted 2-oxazolidinone having at least two epoxy containing substituents which comprises:
   (a) reacting a mixture of an organic polyisocyanate with a polyepoxide, said polyepoxide characterized by having an oxygen atom attached to 2 adjacent carbon atoms for each epoxy group, wherein said mixture contains from about 2 to about 8 epoxy groups per isocyanate group; in the presence of
   (b) a catalytically effective quantity of a mixture of a primary or secondary lower alkanol having from 1 to 6 carbon atoms and a quaternary ammonium halide.

6. A process of claim 5 wherein the quantity of catalyst is from about 0.01% to about 10% by weight, based on the weight of polyisocyanate and polyepoxide reactants, the ratio of alkanol to quaternary being from 3 to 9 parts of the alkanol per part of the quaternary, by weight, and the reaction is conducted within the temperature range of from about 60° C. to about 110° C.

7. A process of claim 6 wherein the lower alkanol is methanol and the quaternary ammonium halide is a lower tetraalkyl ammonium bromide having from 1 to 6 carbon atoms in each alkyl group.

8. A process of claim 7 wherein the polyisocyanate is a tolylene diisocyanate.

9. A process for preparing a substituted 2-oxazolidinone having at least one epoxy group which comprises:
   (a) contacting an organic polyisocyanate with a polyglycidyl ether of a polyol wherein the total number of epoxy groups in the quantity of said polyglycidyl ether reactant is greater than the total number of isocyanate groups in the quantity of polyisocyanate reacted therewith; in the presence of
   (b) a catalytically effective quantity of a quaternary ammonium halide and a primary or secondary alkanol having from 1 to 6 carbon atoms.

10. A process of claim 9 wherein said alkanol is methanol.

11. A process for preparing a substituted 2-oxazolidinone having at least two oxazolidinone groups and at least two epoxy groups which comprises:
   (a) reacting by contacting a polyisocyanate with a poly(glycidyl ether) of a poly(oxyalkylene) polyol, said polyol having a molecular weight of from about 100 to 4,000, and wherein the quantity of said poly(glycidyl ether) contacted with said polyisocyanate provides about 2 to 8 epoxy groups per isocyanate group; in the presence of
   (b) a mixture of catalytically effective quantity of a primary or secondary lower alkanol having from 1 to 6 carbon atoms and a quaternary ammonium halide.

12. A process for preparing a substituted 2-oxazolidinone having at least two epoxy groups which comprise:
   (a) contacting the diglycidyl ether of a polyalkylene glycol having a molecular weight of from about 100 to about 4,000 and 2 to 3 carbon atoms in each alkylene group with an organic diisocyanate wherein about two moles of the diepoxide are contacted with each mole of the diisocyanate; in the presence of
   (b) a catalytically effective quantity of a mixture of a primary or secondary lower alkanol having from 1 to 6 carbon atoms with a lower tetraalkyl ammonium halide having from 1 to 6 carbon atoms in each alkyl group.

13. A process of claim 12 wherein the polyisocyanate is toluene diisocyanate, wherein the diglycidyl ether has a molecular weight of from about 150 to 1,000, the lower alkanol is methanol, the ammonium halide is tetraethyl ammonium bromide and the quantity of methanol and ammonium halide is from 0.01% to about 10% based on the weight of the diglycidyl ether and diisocyanate reactants, and wherein from 3 to 9 parts of the methanol is employed per part of the ammonium halide, by weight.

14. A process for preparing a substituted 2-oxazolidinone having at least two epoxy groups which comprises:
   (a) contacting a mixture of a diisocyanate with a polyglycidyl ether terminated alkylene oxide adduct of a polyol wherein said polyglycidyl ether has a molecular weight of about 150 to 1,000 and wherein said mixture contains from about 2 to about 8 epoxy groups for each isocyanate group; in the presence of
   (b) a catalytically effective quantity of a quaternary ammonium halide and a primary or secondary lower alkanol having from 1 to 6 carbon atoms.

15. A process for preparing a substituted 2-oxazolidinone having at least two epoxy groups which comprises:
   (a) contacting the diglycidyl ether of bis(4-hydroxyphenyl) dimethyl methane with an organic diisocyanate wherein the molar ratio of said diglycidyl ether to diisocyanate is about 2 to 1; in the presence of
   (b) a catalytically effective quantity of a mixture of a quaternary ammonium halide and a primary or secondary lower alkanol having from 1 to 6 carbon atoms.

16. A process for preparing a substituted 2-oxazolidinone having at least one epoxy containing substitutent which comprises: reacting a diurethane of the formula:

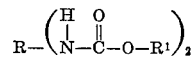

wherein R is the organic residue of a diisocyanate and $R^1$ is an alkyl having from 1 to about 8 carbon atoms; with a polyepoxide, said polyepoxide characterized by having an oxygen atom attached to 2 adjacent carbon atoms for each epoxy group, wherein the total number of epoxy groups in the quantity of polyepoxide reactant is greater than the total number of urethano groups reacted therewith; in the presence of a catalytically effective quantity of a quaternary ammonium halide.

References Cited

UNITED STATES PATENTS

| | | | |
|---|---|---|---|
| 2,977,370 | 3/1961 | Oken | 260—307.3 |
| 3,020,262 | 2/1962 | Speranza | 260—47 |
| 3,142,699 | 7/1964 | Wagner | 260—77.5 |
| 3,267,079 | 8/1966 | Bolinger | 260—77.5 |

SAMUEL H. BLECH, *Primary Examiner.*

T. E. PERTILLA, *Assistant Examiner.*

UNITED STATES PATENT OFFICE
CERTIFICATE OF CORRECTION

Patent No. 3,334,110                                        August 1, 1967

Charles H. Schramm

It is hereby certified that error appears in the above numbered patent requiring correction and that the said Letters Patent should read as corrected below.

Column 4, lines 2 to 7, for the center portion of the formula reading

[ $Z_7$ ]                      read               [ $Z'$ ]

column 5, line 2, for "-O-R-O," read -- -O-R-O-, --; line 51, after "bis(3,4-epoxycyclohexanecarboxylate" insert a closing parenthesis; column 8, line 73, for "150° C." read -- 110° C. --; column 9, lines 1 to 3, strike out "ammonium halide is from about .005% to 15%, by weight of the polyisocyanate and polyepoxide reactants".

Signed and sealed this 25th day of June 1968.

(SEAL)
Attest:

EDWARD M.FLETCHER,JR.                          EDWARD J. BRENNER
Attesting Officer                                  Commissioner of Patents